United States Patent
Wang et al.

(10) Patent No.: US 12,141,807 B2
(45) Date of Patent: Nov. 12, 2024

(54) METHOD AND SYSTEM FOR ASSESSING THE REPUTATION OF A MERCHANT

(71) Applicant: VISA INTERNATIONAL SERVICE ASSOCIATION, San Francisco, CA (US)

(72) Inventors: Liang Wang, Palo Alto, CA (US); Dhruv Gelda, Palo Alto, CA (US); Robert Christensen, Palo Alto, CA (US); Wei Zhang, Palo Alto, CA (US); Hao Yang, Palo Alto, CA (US); Yan Zheng, Palo Alto, CA (US)

(73) Assignee: Visa International Service Association, San Francisco, CA (US)

( * ) Notice: Subject to any disclaimer, the term of this patent is extended or adjusted under 35 U.S.C. 154(b) by 42 days.

(21) Appl. No.: 17/763,255

(22) PCT Filed: Oct. 31, 2019

(86) PCT No.: PCT/US2019/059058
§ 371 (c)(1),
(2) Date: Mar. 24, 2022

(87) PCT Pub. No.: WO2021/086365
PCT Pub. Date: Jun. 5, 2021

(65) Prior Publication Data
US 2022/0366421 A1 Nov. 17, 2022

(51) Int. Cl.
*G06Q 20/40* (2012.01)
*G06Q 30/018* (2023.01)
(52) U.S. Cl.
CPC ..... *G06Q 20/4016* (2013.01); *G06Q 30/0185* (2013.01)

(58) Field of Classification Search
None
See application file for complete search history.

(56) References Cited

U.S. PATENT DOCUMENTS

| 11,030,622 B2* | 6/2021 | DeLawter | G06F 21/6218 |
| 2005/0097320 A1* | 5/2005 | Golan | G06Q 20/4014 |
| | | | 713/166 |

(Continued)

OTHER PUBLICATIONS

International Search Report and Written Opinion for corresponding International Application No. PCT/US19/59058, mailed Jan. 9, 2020, 13 pages.

*Primary Examiner* — William J Jacob
(74) *Attorney, Agent, or Firm* — K&L Gates LLP

(57) ABSTRACT

The system and method may assess the merchant risk level on a more continuous scale rather than a binary categorization. It may produce a continuous risk score proportional to the likelihood of a merchant being risky, effectively addressing the issue of shades of gray encountered by the traditional blacklisting approach. The continuous risk score feature provides greater flexibility as it allows the payment network to make dynamic pricing decisions (known as interchange optimization) based on the merchant risk level. Using collective intelligence from transactions across the payment network, the system and method may be able to assess the merchant risk level with high accuracy. The system and method may be particularly beneficial to small merchants with low transaction volume as even a few fraudulent transactions can easily put them in the high-risk merchant category. Further, the system and method may help payment processing networks make better decision on cross-border transactions.

20 Claims, 13 Drawing Sheets

(56) References Cited

U.S. PATENT DOCUMENTS

| | | | | |
|---|---|---|---|---|
| 2006/0149671 A1* | 7/2006 | Nix | G06Q 20/24 | 705/40 |
| 2007/0106582 A1* | 5/2007 | Baker | G06Q 40/00 | 705/35 |
| 2007/0239606 A1* | 10/2007 | Eisen | H04L 63/1408 | 705/51 |
| 2007/0288380 A1* | 12/2007 | Starrs | G06Q 20/042 | 705/45 |
| 2007/0288641 A1* | 12/2007 | Lee | G06Q 40/03 | 709/227 |
| 2008/0288405 A1* | 11/2008 | John | G06Q 20/384 | 705/44 |
| 2011/0196791 A1* | 8/2011 | Dominguez | G06Q 40/00 | 705/44 |
| 2012/0023567 A1* | 1/2012 | Hammad | G06Q 20/4018 | 726/9 |
| 2012/0158540 A1* | 6/2012 | Ganti | G06Q 30/0185 | 705/26.35 |
| 2014/0316960 A1 | 10/2014 | Katepally et al. | | |
| 2014/0337171 A1* | 11/2014 | Sivashanmugam | G06Q 20/4016 | 705/26.35 |
| 2015/0106260 A1* | 4/2015 | Andrews | G06Q 20/4016 | 705/39 |
| 2015/0161609 A1* | 6/2015 | Christner | G06Q 20/4016 | 705/44 |
| 2015/0193768 A1* | 7/2015 | Douglas | G06Q 20/4016 | 705/44 |
| 2015/0339673 A1 | 11/2015 | Adjaoute | | |
| 2016/0260102 A1 | 9/2016 | Nightengale et al. | | |
| 2016/0364727 A1 | 12/2016 | DeLawter et al. | | |
| 2019/0228415 A1* | 7/2019 | Adjaoute | G06Q 30/0225 | |
| 2020/0210913 A1* | 7/2020 | Daggubati | G06F 16/258 | |
| 2020/0211019 A1* | 7/2020 | Allbright | G06N 20/10 | |

* cited by examiner

METHOD AND SYSTEM FOR ASSESSING THE REPUTATION OF A MERCHANT

CROSS REFERENCE TO RELATED APPLICATIONS

This application is a U.S. national stage application, filed under 35 U.S.C. § 371, of International Application No. PCT/US2019/059058, which was filed on Oct. 31, 2019, the contents of which are hereby incorporated by reference into this specification.

BACKGROUND

Payment fraud is a serious and growing concern for merchants, especially online retailers. Apart from the financial cost, fraud and/or chargebacks also impact merchant reputation and increase customer attrition. Further, excessive chargebacks may result in a merchant being placed on a watchlist known as MATCH-MasterCard Alert to Control High-risk Merchants. Once a merchant is placed on MATCH, it may remain on the watchlist for a period of 5 years. A placement on MATCH may significantly harm a merchant. Not only does it follow a termination of the merchant account, but it also may serve to inform other acquiring banks that there is something seriously wrong with the business. Consequently, being added to a watchlist often results in the end of payment processing capabilities for the merchant as it becomes extremely difficult for a merchant to find a new acquiring bank, on any terms.

Merchants may be aware of the consequences, but they lack the capital and resources to fight fraudulent transaction and/or chargebacks. Small merchants with low transaction volume are especially at risk as they do not have access to a significant portion of the transactions across the payment network to develop an effective fraud detection solution. Therefore, there is a need to develop a dynamic and reliable system that can precisely assess the merchant risk level.

SUMMARY

A system and method are described that may evaluate an adaptive risk score and caution an innocent merchant when it is being be attacked by illicit fraudsters or before it is placed on the MATCH watchlist. The system and method may have the contributions:

Near-real time: Detailed statistics on the percentage of fraud and chargeback transactions may not be known to the merchant immediately as it could take one to six months for the chargeback process to be completed. Therefore, quite often the merchants may have no idea of these chargebacks and frauds until they are informed by acquiring banks. Also, given the temporal nature of fraudulent activity, a previously low-risk merchant could become a high-risk merchant for a short-period of time due to a burst of fraud attacks and then drop back to normal levels of frauds and/or chargebacks. The proposed system and method may be dynamic in that it may evaluate the merchant risk level in near real-time and provide early-warning notification to the merchant.

Continuous vs Discrete: The system and method may improve upon the traditional approach of categorizing merchants into two groups: low-risk and high-risk. The proposed system and method may be able to assess a continuous risk score proportional to the likelihood of a merchant being risky, effectively addressing the issue of 'shades of gray' encountered in the traditional blacklisting approach. A continuous risk score may offer greater flexibility to a payment processing network as it allows the network to make dynamic pricing decisions (known as interchange optimization). For instance, the network may decide to charge a higher interchange fee from a merchant whose transactions have an elevated risk.

Reliability: The system and method may evaluate the merchant risk level based on collective transaction behavior from merchants across the whole payment network. Each transaction from a user may be scored not only based on the information associated with the current merchant, but also based on the information associated with previous merchants where the user transacted. The merchant risk level may be obtained by aggregating the risk scores over all the transactions that occurred at a particular merchant. Therefore, the merchant risk level obtained may be quite reliable which may be especially beneficial to small merchants with low transaction volume as even a few fraudulent transactions can easily push them into a high-risk merchant category.

Further, the system and method may help payment processing networks make better decision on cross-border transactions. Merchants in some countries such as China and Russia have no obligations to report fraudulent transactions. Using collective intelligence from past user transactions at merchants that report frauds, the system and method may assess the risk level of merchants that don't report frauds.

Thus, the system and method may assess the merchant risk level on a more continuous scale rather than a binary categorization. It may produce a continuous risk score proportional to the likelihood of a merchant being risky, effectively addressing the issue of shades of gray encountered by the traditional blacklisting approach. The continuous risk score feature provides greater flexibility as it allows the payment network to make dynamic pricing decisions (known as interchange optimization) based on the merchant risk level. Using collective intelligence from transactions across the payment network, the system and method may be able to assess the merchant risk level with high accuracy. The system and method may be particularly beneficial to small merchants with low transaction volume as even a few fraudulent transactions can easily put them in the high-risk merchant category. Further, the system and method may help payment processing networks make better decision on cross-border transactions.

DETAILED DESCRIPTION

Figure 1:
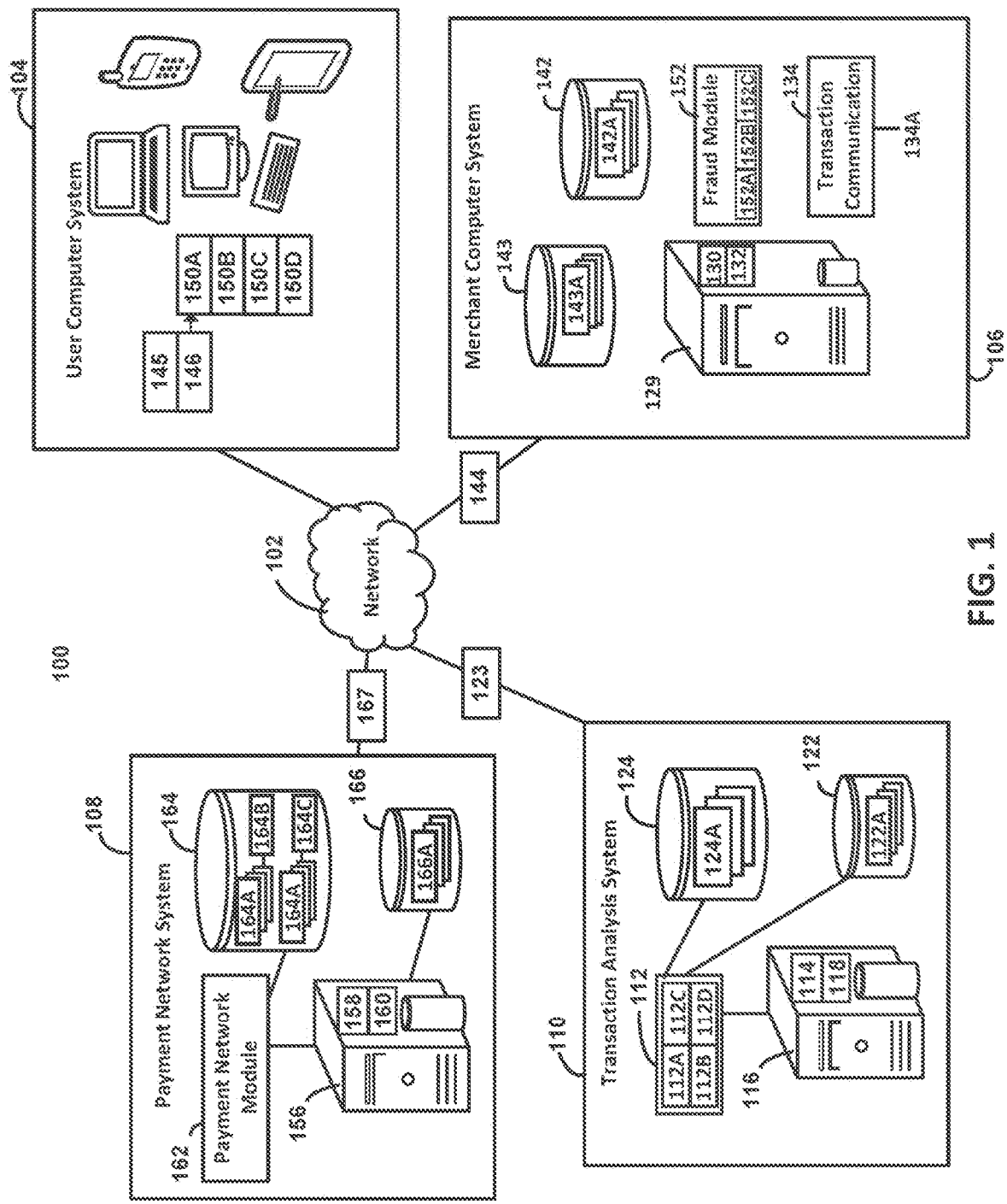
FIG. 1 may be an illustration of the computers used in the system.

The present disclosure now will be described more fully hereinafter with reference to the accompanying drawings, which form a part hereof, and which show, by way of illustration, specific exemplary embodiments by which the disclosure may be practiced. These illustrations and exemplary embodiments are presented with the understanding that the present disclosure is an exemplification and is not intended to be limited to any one of the embodiments illustrated. The disclosure may be embodied in many different forms and should not be construed as limited to the embodiments set forth herein; rather, these embodiments are provided so that this disclosure will be thorough and complete, and will fully convey the scope of the disclosure to those skilled in the art. Among other things, the present disclosure may be embodied as methods or devices. Accordingly, the present disclosure may take the form of an entirely hardware embodiment, an entirely software embodiment or an embodiment combining software and hardware aspects. The following detailed description is, therefore, not to be taken in a limiting sense.

The system 100 may include a computer network 102 that links one or more systems and computer components. In some embodiments, the system 100 includes a user computing device 104, a merchant computer system 106, a payment network system 108 and a transaction analysis system 110.

The network 102 may be described variously as a communication link, computer network, internet connection, etc. The system 100 may include various software or computer-executable instructions or components stored on tangible memories and specialized hardware components or modules that employ the software and instructions in a practical application to manage network nodes for a transaction, as described herein.

The various modules may be implemented as computer-readable storage memories containing computer-readable instructions (i.e., software) for execution by one or more processors of the system 100 within a specialized or unique computing device. The modules may perform the various tasks, steps, methods, blocks, etc., as described herein. The system 100 may also include both hardware and software applications, as well as various data communications channels for communicating data between the various specialized and unique hardware and software components.

Networks are commonly thought to comprise the interconnection and interoperation of hardware, data, and other entities. A computer network, or data network, is a digital telecommunications network which allows nodes to share resources. In computer networks, computing devices exchange data with each other using connections, e.g., data links, between nodes. Hardware networks, for example, may include clients, servers, and intermediary nodes in a graph topology (e.g., the user computer system 104, the merchant computer system 106, and the payment network system 108 and the transaction analysis system 110). In a similar fashion, data networks may include data nodes in a graph topology where each node includes related or linked information, software methods, and other data. A node such as the mobile computing device 104 may be managed to facilitate transactions with other nodes of the system (e.g., the merchant computer system) based on the data and instructions of various other nodes of the system 100.

It should be noted that the term "server" as used throughout this application refers generally to a computer, other device, program, or combination thereof that includes a processor and memory to process and respond to the requests of remote users/nodes across a communications network. Servers send their information to requesting "clients." The term "client" as used herein refers generally to a computer, program, other device, user and/or combination thereof that is capable of processing and making requests and obtaining and processing any responses from servers across a communications or data network. A computer, other device, set of related data, program, or combination thereof that facilitates, processes information and requests, and/or furthers the passage of information from a source user to a destination user is commonly referred to as a "node." Networks are generally thought to facilitate the transfer of information from source points to destinations. A node specifically tasked with furthering the passage of information from a source to a destination is commonly called a "router." There are many forms of networks such as Local Area Networks (LANs), Pico networks, Wide Area Networks (WANs), Wireless Networks (WLANs), etc. For example, the Internet is generally accepted as being an interconnection of a multitude of networks whereby remote clients and servers may access and interoperate with one another.

The mobile computing device 104 may include a smartphone 104 or other computing device capable of sending and receiving a wireless digital communication. The mobile computing device may include a processor 145, a memory 146, and a battery 147. The mobile computing device 104 may include an RFID tag 104A or other device capable of sending a radio signal including mobile computing device data such as a battery charge level 107. The memory 146 of the mobile computing device 104 may include various modules including instructions that, when executed by the processor 145 control the functions of the mobile computing device 104 generally and integrate the mobile computing device into the system 100 in particular. For example, some modules may include an operating system 150A, a browser module 150B, a communication module 150C, and a wallet module 150D. The communication module 150C may include processor-executable instructions to send and/or receive a signal from contactless component of the system. In some embodiments, the communication module 150C may include an RFID receiver or instructions to implement an RFID receiver. The wallet module 150D may also include payment device data 151. The payment device data 151 may securely identify a payment device 250 (FIG. 2) and a user's payment account information to facilitate a transaction between the mobile computing device 104 and the merchant computer system 106. In some embodiments, the payment device data 151 may be tokenized such that only a trusted partner may access the payment device data 151.

The merchant computer system 106 may include a computing device such as a merchant server 129 including a processor 130 and memory 132 including components and instruction modules including processor-executable instructions to facilitate transactions with the mobile computing device 104 via other entities of the system 100. In some embodiments, the memory 132 may include a transaction communication module 134. The transaction communication module 134 may include instructions to send merchant messages 134A to other entities (i.e., 104, 108, 110) of the system 100 to indicate a transaction has been initiated with the mobile computing device 104 generally and wallet module 150D in particular including payment account data, location data, and other data as herein described. For example, a node of the system 100 (e.g., the mobile computing device 104 generally and the browser module 150B in particular) may access a merchant website to initiate a transaction. Some examples of transactions include ticket sales for specific seats at a venue.

The merchant computer system 106 may also include a transaction repository 142 and instructions to store payment and other transaction data 142A within the transaction repository 142. The merchant computer system 106 may also include a product repository 143 and instructions to store product and other data 143A within the product repository 143. In some embodiments, the merchant computer system 106 may also include instructions to send payment device data 151 corresponding to the payment device 250 (FIG. 2), transaction data 143A, and/or product data 143B and other data it received during a transaction to the payment network system from the mobile computing device 104.

The payment network system 108 may include a payment server 156 including a processor 158 and memory 160. The memory 160 may include a payment network module 162 including instructions to facilitate payment between parties (e.g., one or more users, merchants, etc.) using the system 100. The module 162 may be communicably connected to an account holder data repository 164 including payment network account data 164A. The payment network account data 164A may include any data to facilitate payment and other funds transfers between system entities (e.g., 104, 106 and 110). For example, the payment network account data 164A may include identification data, account history data, payment device data, etc. The module 162 may also include instructions to send payment messages 166 to other entities and components of the system 100 in order to complete transactions between the mobile computing system 104 and the merchant computer system 106. For example, the module 162 may include instructions to send a payment message 166 to a transaction analysis system 110 or other entity of the system 100 to complete a purchase transaction. The message 166 may include data to authorize a purchase transaction such as an authorization number or other identification, and may be tokenized or encrypted by the system 100 before the message 166 is sent over the network 102 to a system entity.

The transaction analysis system 110 may be used to provide real time or virtual real time analysis of a merchant's risk score. A server 116 may have a memory to store computer executable instructions which may physically configure a processor 118 according to the computer executable instructions. A table of transactions 112 may store individual transactions 112A, 112B, 112C and 112D for periodic or real time analysis. The transaction data may be stored in databases 112 and 124 which may contain past entries 122A and 124A which may be used to analyze the risk of present transactions.

Figure 2:
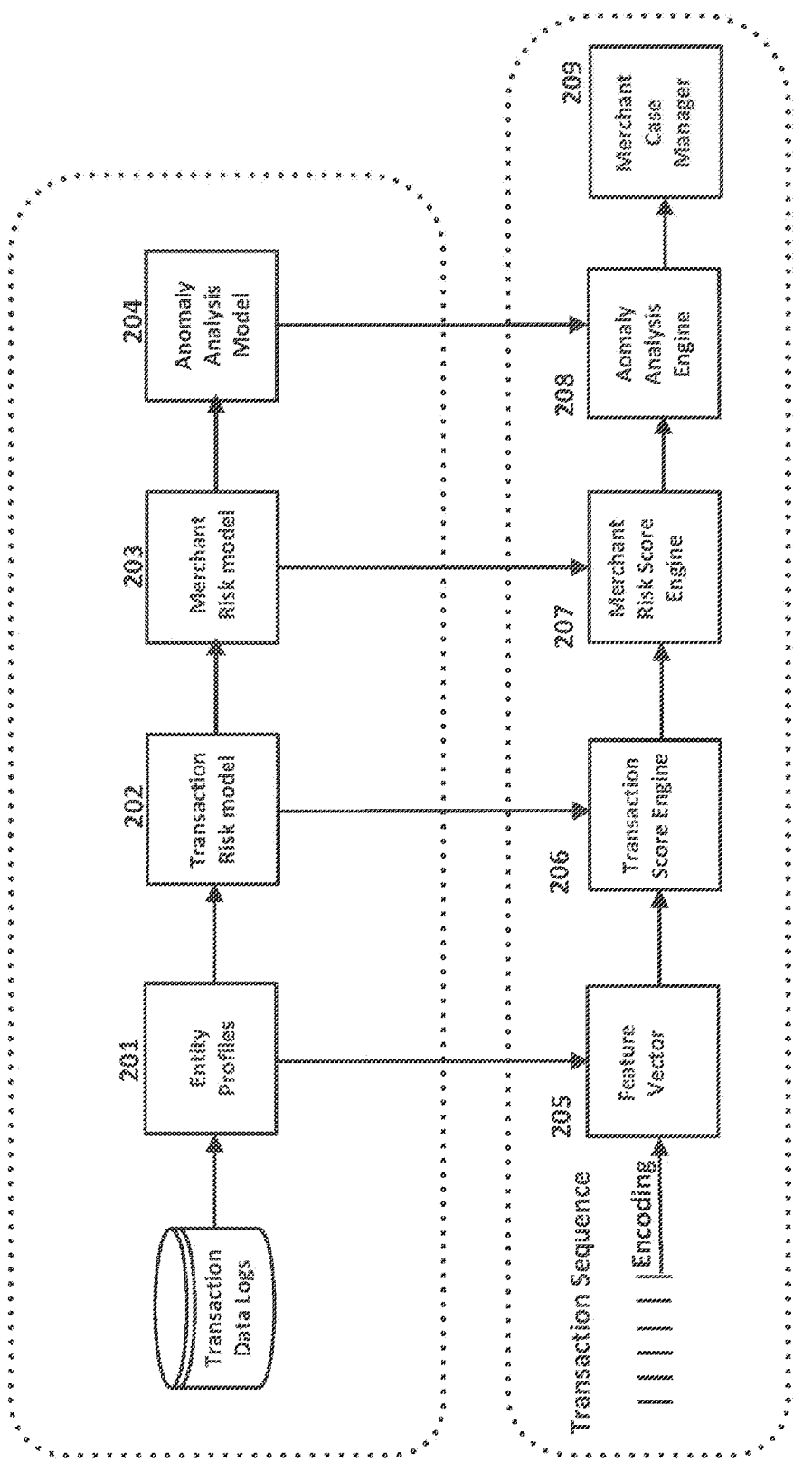
FIG. 2 may be an illustration of the computing elements that may be part of the system and may execute the method.

Referring to FIG. 2, an embodiment of a system and method to create a real-time determination of a merchant risk level may be illustrated. As part of the determination, an entity 201 may be a user, a payment card, a merchant, a merchant category code (MCC), a merchant category group (MCG) or a postal code. Two types of entity profiles may be created in the current system-one based on domain knowledge, and the other based on a representation learning method.

Domain Knowledge

Figure 11:
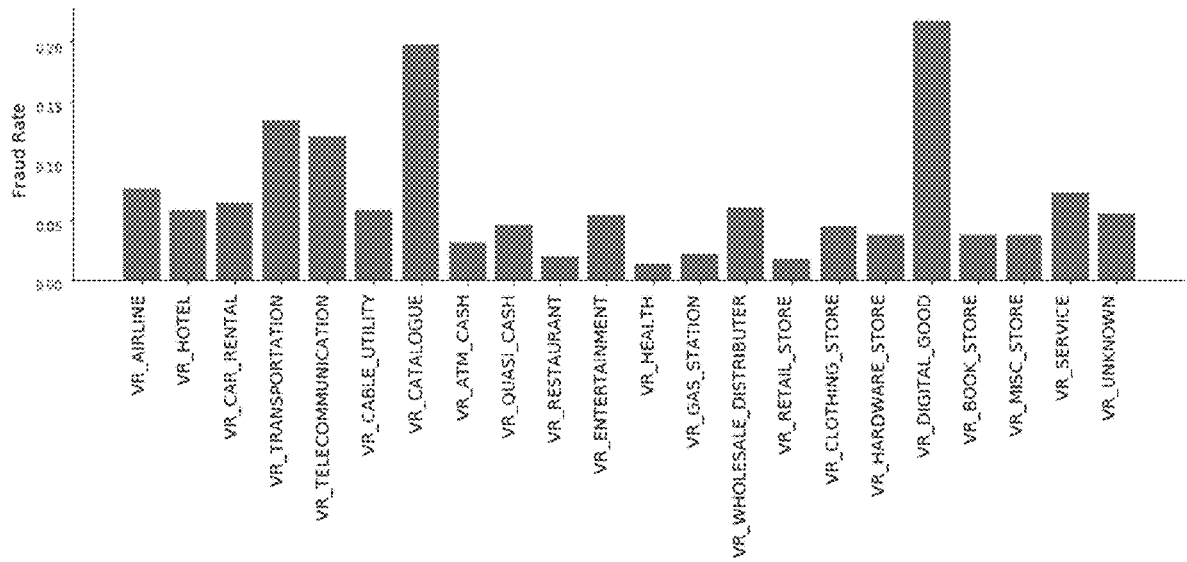
FIG. 11 may illustrate a distribution of fraud rate across different merchant category groups.

Typical domain knowledge-based entity profiles may include historical fraud rate, decline rate, average dollar amount, etc. A typical example of such an entity profile—the distribution of fraud rate across different merchant category groups (MCGs) is shown in FIG. 11.

Learning Profile

Representation learning-based profiles may include user and merchant embeddings. An embedding may be a representation of a topological object, manifold, graph, field, etc. in a certain space in such a way that its connectivity or algebraic properties are preserved. User embeddings may be created by first collecting all the user-merchant pairs in transaction data and then grouping the pairs by distinct merchants. For each unique merchant, a list of all the transactions and the corresponding users may be found. The users may then be temporally ordered based on the time of transaction. Each user in the sequence may be treated as a "word" and the entire sequence may be treated as a "sentence". By repeating the same procedure across all the active merchants, a corpus of millions of sentences may be created. Word2vec or a similar algorithm may be used to generate an embedding for each user. Similarly, merchant embeddings may be created by first collecting all user-merchant pairs in transaction data and then grouping the pairs by distinct users. Each user embedding may be a 200-dimension float vector while each merchant embedding may be a 400-dimension float vector. The number of dimensions for each embedding representation may be chosen to be both efficient and effective for the task at hand. Both domain knowledge-based and representation learning-based entity profiles may be updated periodically.

Transaction Risk Model

The transaction risk model 202 may be trained offline in a supervised way using a combination of entity profiles and non-aggregated transaction specific features (such as location, time, dollar amount, etc.) as features and chargeback/fraud information as labels. The output of the model may be the probability of a transaction being fraudulent.

The probability may be converted into a risk score value between 1 and 100 where a higher score indicates a high-risk transaction, and a lower score indicates a low-risk transaction. To score each transaction, the proposed system may use a variety of models. Two models that may be used as an ensemble may include (i) Gradient Boosting Machine (GBM), and (ii) Recurrent Neural Network (RNN) including two long short-term memory (LSTM) layers.

At a high level, machine learning may be used to score transactions over time such that past scores may be analyzed in view of the resulting fraud to better determine the most appropriate scores in the future. In some embodiments, the scoring may be refined over time. Machine learning may be used to analyze past scores in view of the actual results of users or entities using credit. Machine learning may be used to review a training group of past scored data and determine weighting moving forward.

Figure 6:
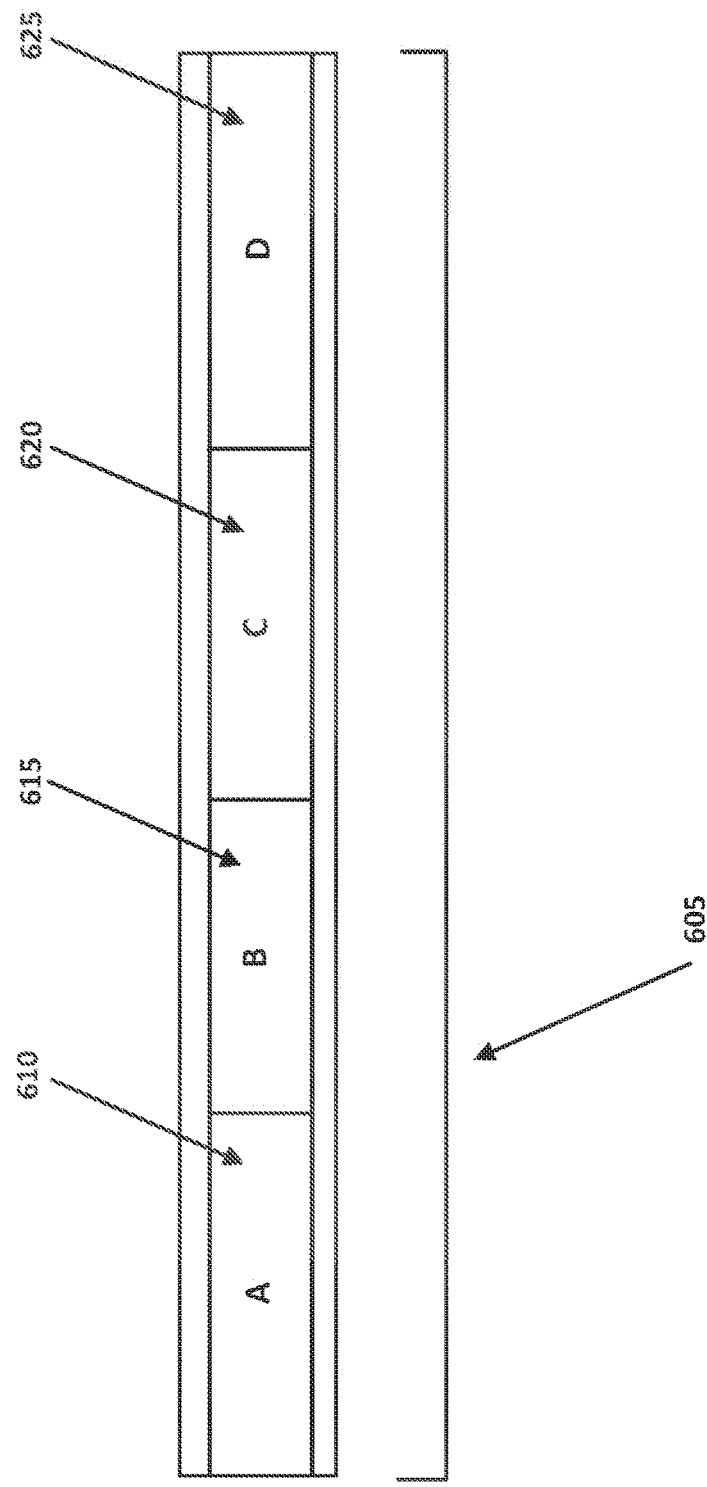
FIG. 6 may illustrate an initial data set.
Figure 7A:
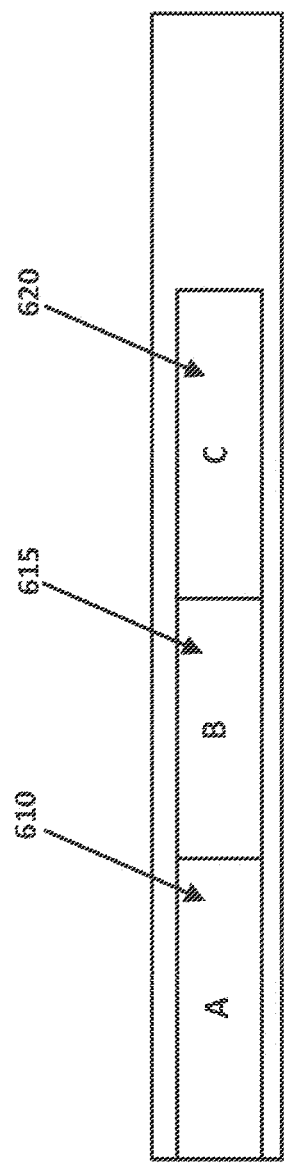
FIG. 7A may illustrate the rotation of training sets.
Figure 7A:
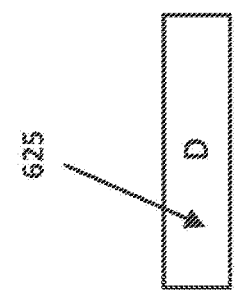
Figure 7B:
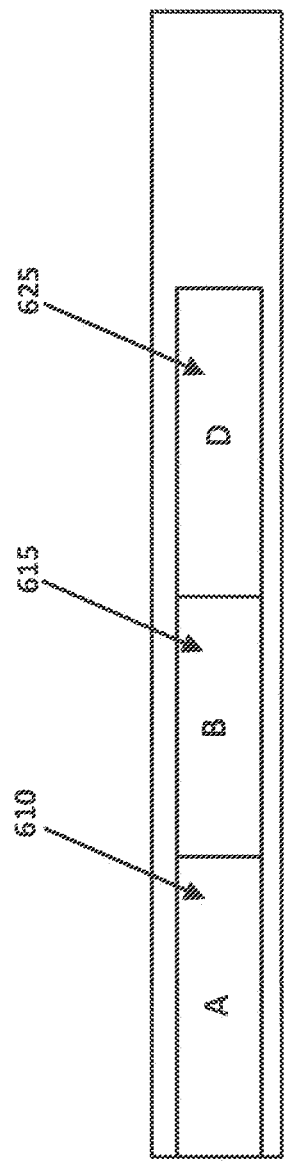
FIG. 7B may illustrate the rotation of training sets.
Figure 7B:
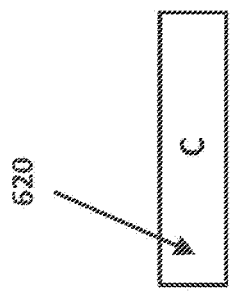

FIG. 6 may illustrate sample artificial intelligence (AI) training data according to one or more embodiments. As an example and not a limitation, an artificial intelligence system may be trained by analyzing a set of training data 605. The training data may be broken into sets, such as set A 610, set B 615, set C 620 and set D 625. As illustrated in FIG. 7a, one set may be used as a testing set (say set D 625) and the remaining sets may be used as training set (set A 610, set B 615 and set C 620). The artificial intelligence system may analyze the training set (set A 610, set B 615 and set C 620) and use the testing set (set D 625) to test the model created from the training data. Then the data sets may shift as illustrated in FIG. 7b, where the test data set may be added to the training data sets (say set A 610, set B 615 and set D 625) and one of the training data sets that have not been used to test before (say set C 620) may be used as the test data set. The analysis of the training data (set A 610, set B 615 and set D 625) may occur again with the new testing set (set C 620) being used to test the model and the model may be refined. The rotation of data sets may occur repeatedly until all the data sets have been used as the test data sets. The model then may be considered complete and the model may then be used on additional data sets.

Figure 4:
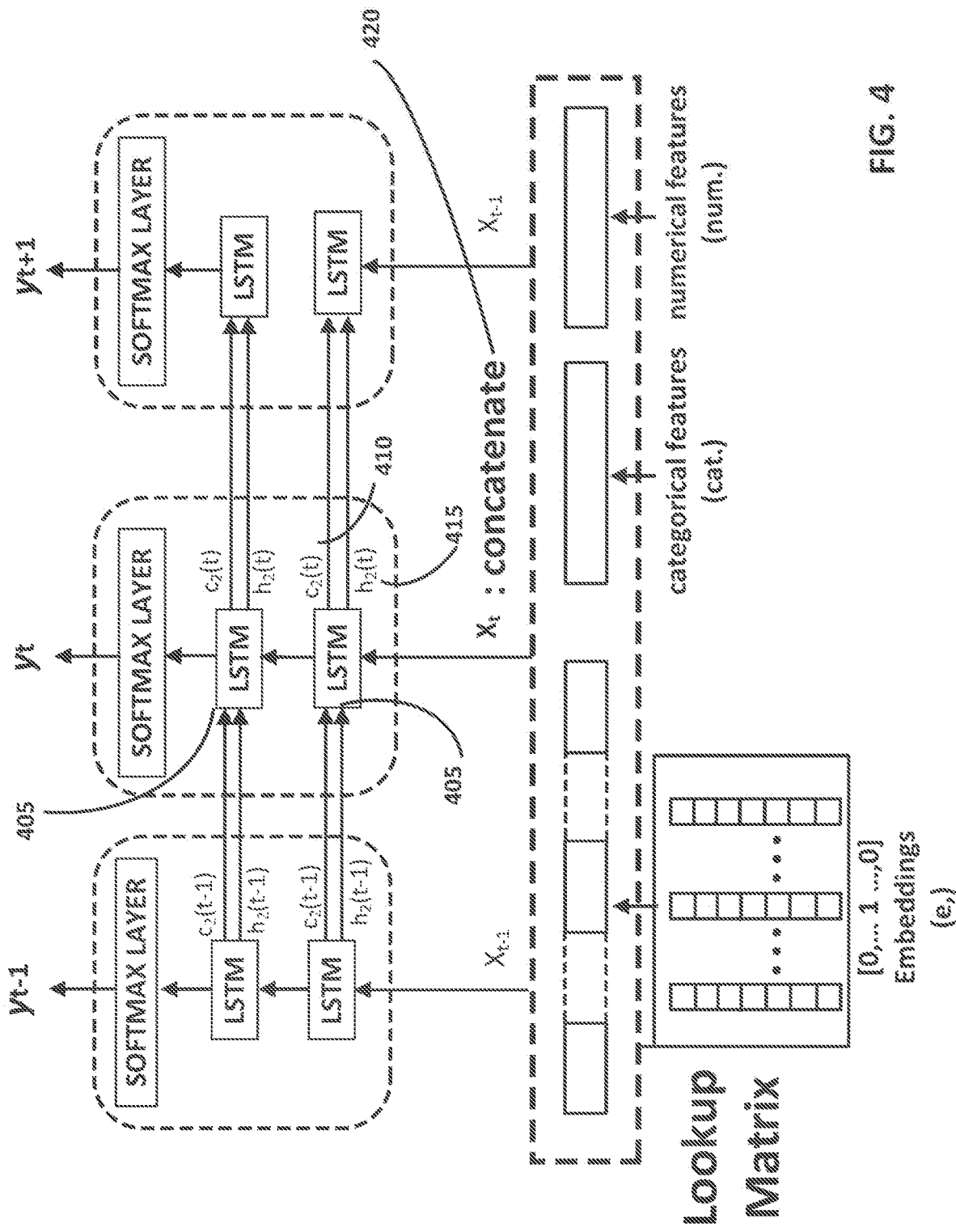
FIG. 4 may illustrate an example RNN model architecture.

The RNN model architecture may be illustrated in FIG. 4. LSTM 405 may process a cardholder's transaction sequence one at a time and may maintain a cell state vector c(t) 410 and a hidden state vector h(t) 415 which may act as a memory for past transaction behavior. The cell state vector c(t) 410 may store information for longer periods of time, while the hidden state vector h(t) 415 may store information for shorter periods of time. At each time step, LSTM 405 may reset, modify or mask the two state vectors 410 415 using in-built gating mechanisms. The two state vectors c(t) 410 and h(t) 415 at any time step t may be concatenated 420 into {c(t), h(t)} which may then be updated based on previous state vectors c(t−1), h(t−1) and the current input vector x(t):

$$(c(t),h(t))=LSTM(c(t-1),h(t-1),x(t)) \quad \text{(Equation 1)}$$

In Equation 1, the current input vector x(t) may consist of entity profiles created from the transaction logs.

Figure 12:
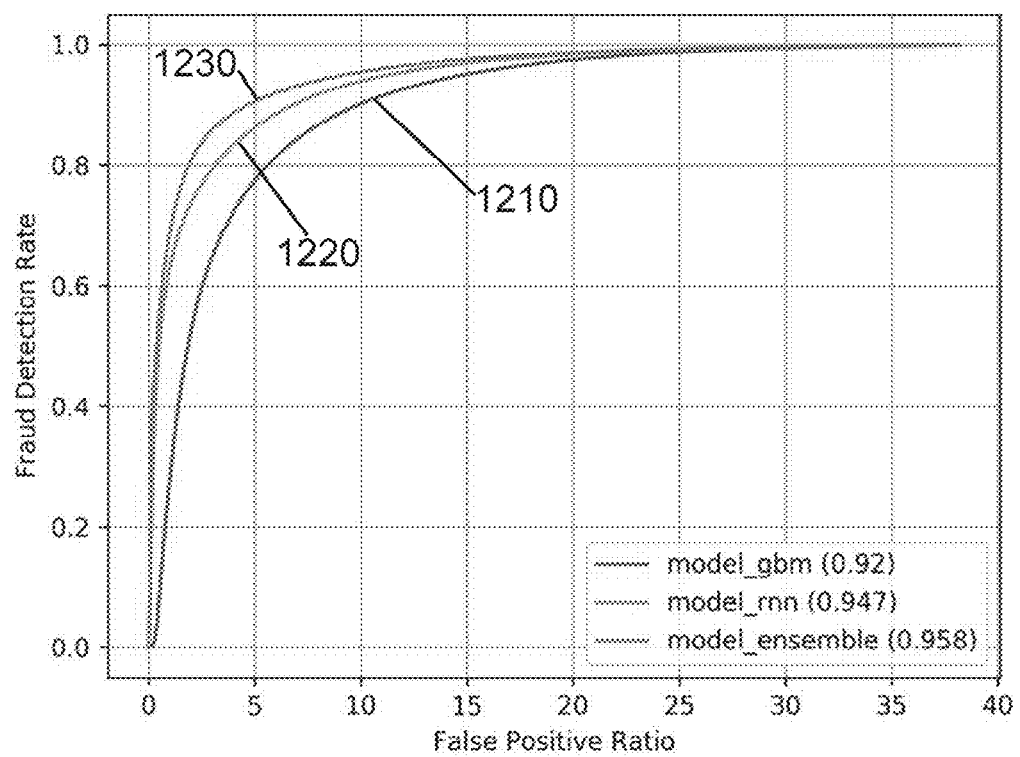
FIG. 12 may illustrate performance curves of models for scoring transactions.

The prediction from the deep recurrent neural network model may be obtained by $$\hat{y}(t)=\text{softmax}(Wh(t)+b) \quad \text{(Equation 2)}$$

where W, b are learnable parameter arrays. The prediction $\hat{y}_t$ may act as a risk score indicating if a transaction is high-risk. The final risk score from a transaction may be a weighted average of the scores obtained from GBM and RNN models. FIG. 12 may illustrate examples of performance curves of the GBM model 1210, the RNN model 1220, and the ensemble model 1230.

An ensemble of two models may result in noticeable performance improvement. The values in the parentheses as indicated in FIG. 12 may report the area-under-curve (AUC) score for the corresponding model. The higher the AUC value, the better the model performance.

Merchant Risk Model

The transaction risk model 202 introduced in the previous session may produce a risk score for each transaction that occurs at a merchant using a transaction score engine 206 (FIG. 2). The merchant risk model 203 may then aggregate the transaction risk scores corresponding to a merchant and may yield a merchant risk score in the range 1-100 using a merchant risk score engine 207 (FIG. 2). A higher score may indicate a high-risk merchant, and a lower score may indicate a low-risk merchant. Logically, the scores may be adjusted to reflect the desires of the user.

Figure 5:
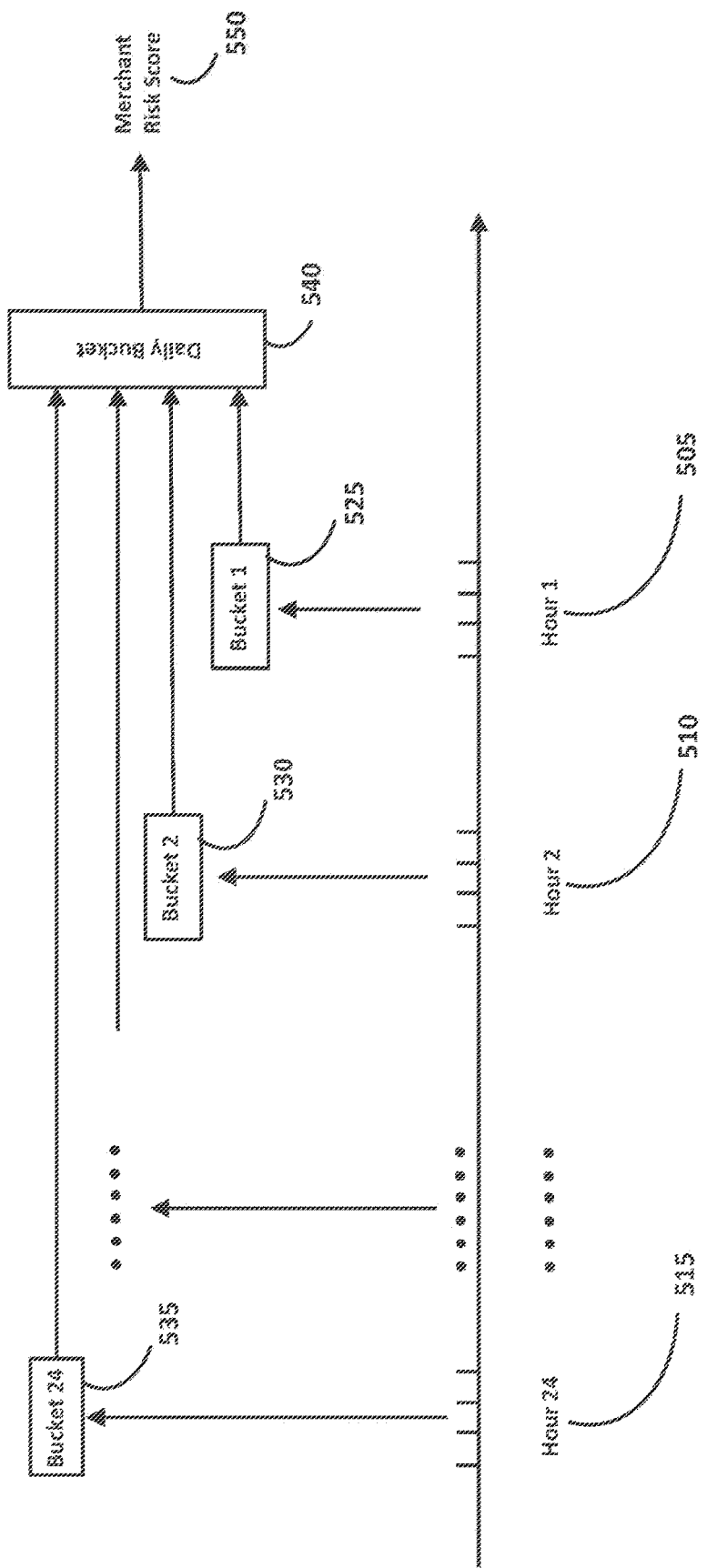
FIG. 5 may illustrate the collection of data on an hourly basis which is aggregated periodically.

The system and method may attribute a risk score to a merchant in near real-time, but it may take ~1 day for an investigation team to review the merchants exhibiting anomalous behavior if needed. As illustrated in FIG. 5, the proposed system may aggregate risk scores on an hourly basis such as hour 1 (505), hour 2 (510) through hour 24 (515) by storing the hourly transactions in a bucket such as bucket 1 (525) for hour 1 (505), bucket 2 (530) for hour 2 (510) and bucket 24 (535) for hour 24 (515) and taking the mean of risk scores for transactions that occur within that hour. Then the system may compile the aggregated risk scores at the end of each day in a daily bucket (540) to generate a merchant risk score (550).

An anomaly detection algorithm 208 (FIG. 2) in an anomaly analysis model 204 may update the merchant risk score to generate a suspicious merchant list for review. The anomaly detection algorithm 208 may take on many forms. In one embodiment, the algorithm may simply look for merchant risk scores that are over a threshold. In another embodiment, the algorithm may highlight merchant risk scores which have changed more than expected over a time period, such as one day to the next. In yet another embodiment, the algorithm may highlight merchant risk scores which have experienced the greatest percentage change over a period of time. Of course, all or some of the different measurements described may be part of a single algorithm and may be given different weights to determine which merchants may need to be studied more closely by a merchant case manager 209.

Anomaly Analysis Model 204

Figure 13:
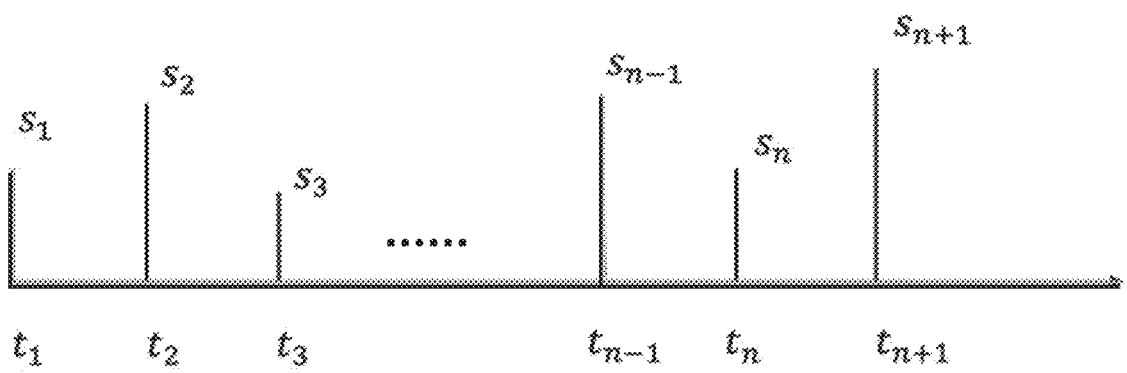
FIG. 13 may illustrate a time series of daily aggregated merchant risk scores. Persons of ordinary skill in the art will appreciate that elements in the figures are illustrated for simplicity and clarity so not all connections and options have been shown to avoid obscuring the inventive aspects. For example, common but well-understood elements that are useful or necessary in a commercially feasible embodiment are not often depicted in order to facilitate a less obstructed view of these various embodiments of the present disclosure. It will be further appreciated that certain actions and/or steps may be described or depicted in a particular order of occurrence while those skilled in the art will understand that such specificity with respect to sequence is not actually required. It will also be understood that the terms and expressions used herein are to be defined with respect to their corresponding respective areas of inquiry and study except where specific meaning have otherwise been set forth herein.

One contributions of the proposed solution may be the near-real time anomaly detection capability for millions of merchants in a payment network. For example, FIG. 13 may illustrate a time series for viewing the daily aggregated merchant risk scores.

For the daily aggregated merchant risk scores, the anomaly analysis model 204 may utilize a recursive exponential filter to identify anomalous merchant behavior. The recursive exponential filter, which may be analogous to the widely known Kalman filter, may eliminate the need to store and reprocess past transaction records each time the risk score needs to be updated. Below may be an illustration of a time series showing a sequence of pairs $\{s_1, t_1\}$, $\{s_2, t_2\}, \ldots, \{s_n, t_n\}, \{s_{n+1}, t_{n+1}\}$, where $s_i$ is the merchant risk score at time $t_i$.

Let $\{s_i, t_i\}$ represent a sequence of pairs, where $s_i$ is the daily aggregated merchant risk score for day $t_i$. The merchant risk level on day $t_n$ may be defined as a running average $y_n$ which may then be given by $$y_n = \sum_{i=1}^{n} e^{-(t_n-t_i)/T} s_i / \sum_{i=1}^{n} e^{-(t_n-t_i)/T} \quad \text{(Equation 3)}$$

where T is a decay parameter that controls how quickly should the model may forget about the past history.

After the next daily merchant risk score observation at time $t_{n+1}$, the merchant risk level $y_{n+1}$ may be calculated as $$y_{n+1} = \sum_{i=1}^{n+1} e^{-(t_{n+1}-t_i)/T} s_i / \sum_{i=1}^{n+1} e^{-(t_{n+1}-t_i)/T} \quad \text{(Equation 4)}$$

With slight manipulation of Equation 3 and Equation 4, the system and method may represent $y_{n+1}$ using the following recursive formula:

$$y_{n+1} = y_n + K_{n+1}(s_{n+1} - y_n) \quad \text{(Equation 5)}$$

where $K_{n+1}$ may also be cast in a recursive formula:

$$K_{n+1} = K_n / (K_n + e^{-(t_{n+1}-t_n)/T}) \quad \text{(Equation 6)}$$

A significant deviation of the merchant risk level $y_{n+1}$ from $y_n$ may indicate an anomaly. It is important to notice an entire history of merchant risk scores may not need to be stored. Instead, the previous risk score $s_n$, previous merchant risk level $y_n$, and $K_n$ may only be needed to be stored.

Figure 8:
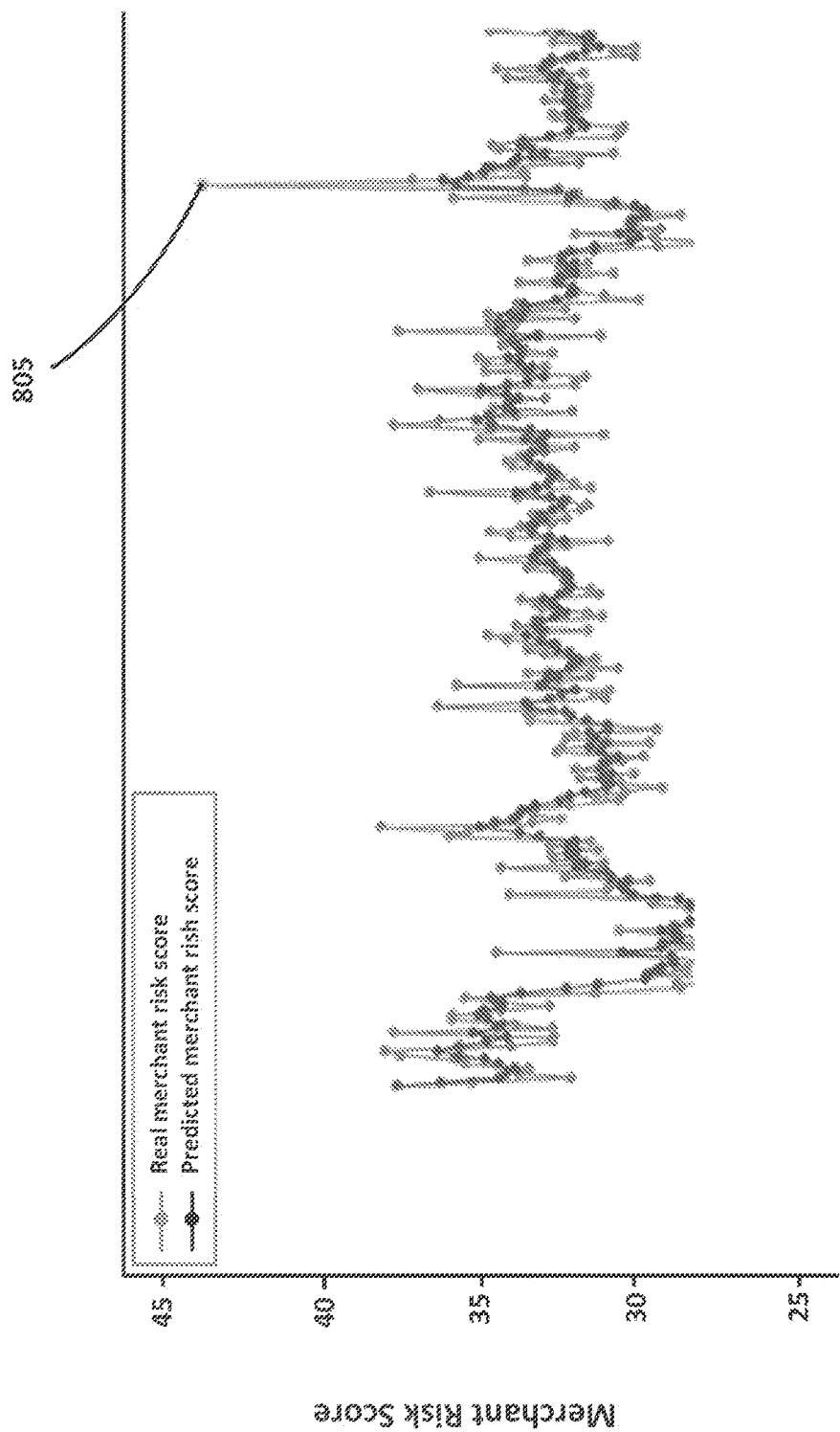
FIG. 8 may illustrate a point anomaly where a single spike 805 may be seen in the graph.
Figure 9:
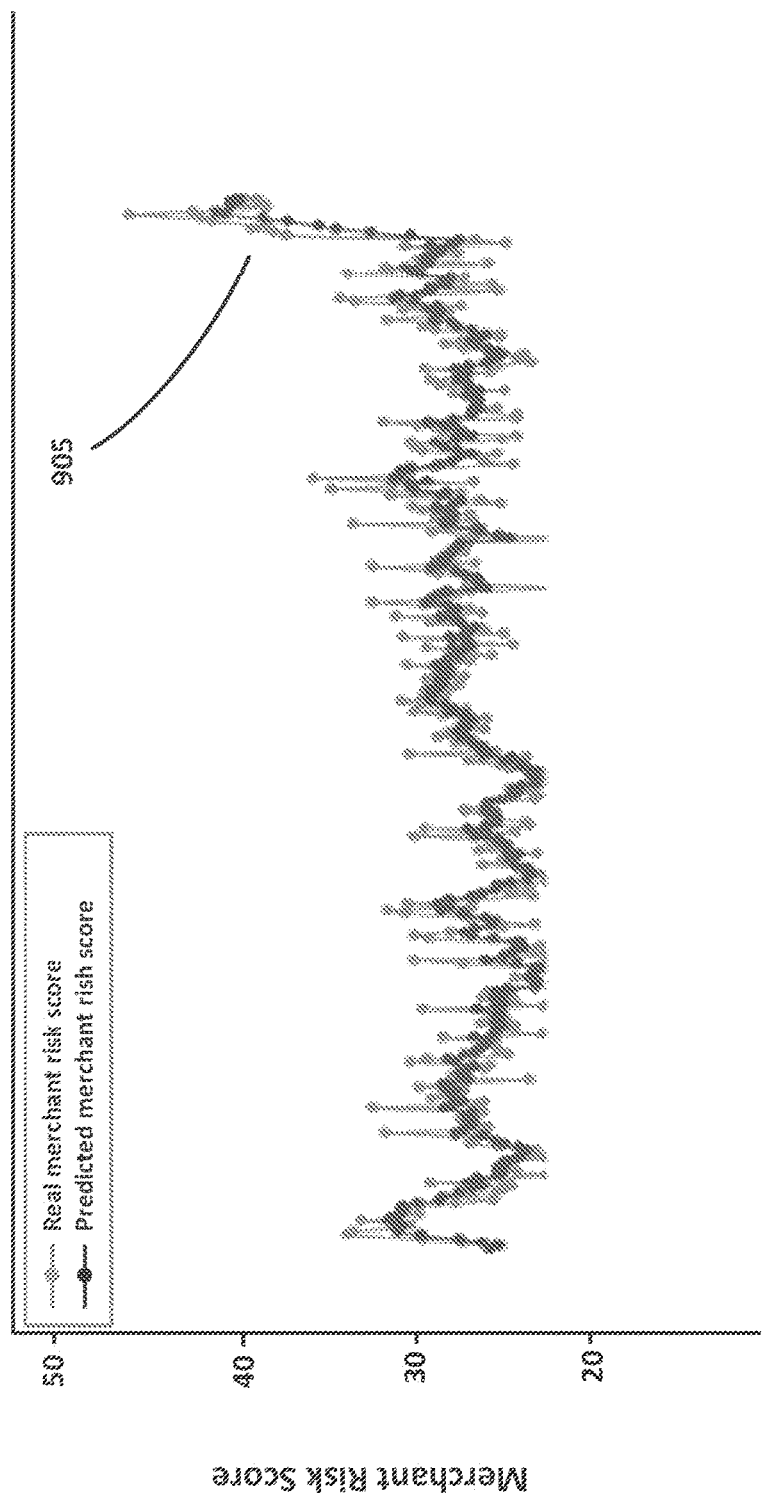
FIG. 9 may illustrate a score shift 905 (from low to high) followed by two spikes.
Figure 10:
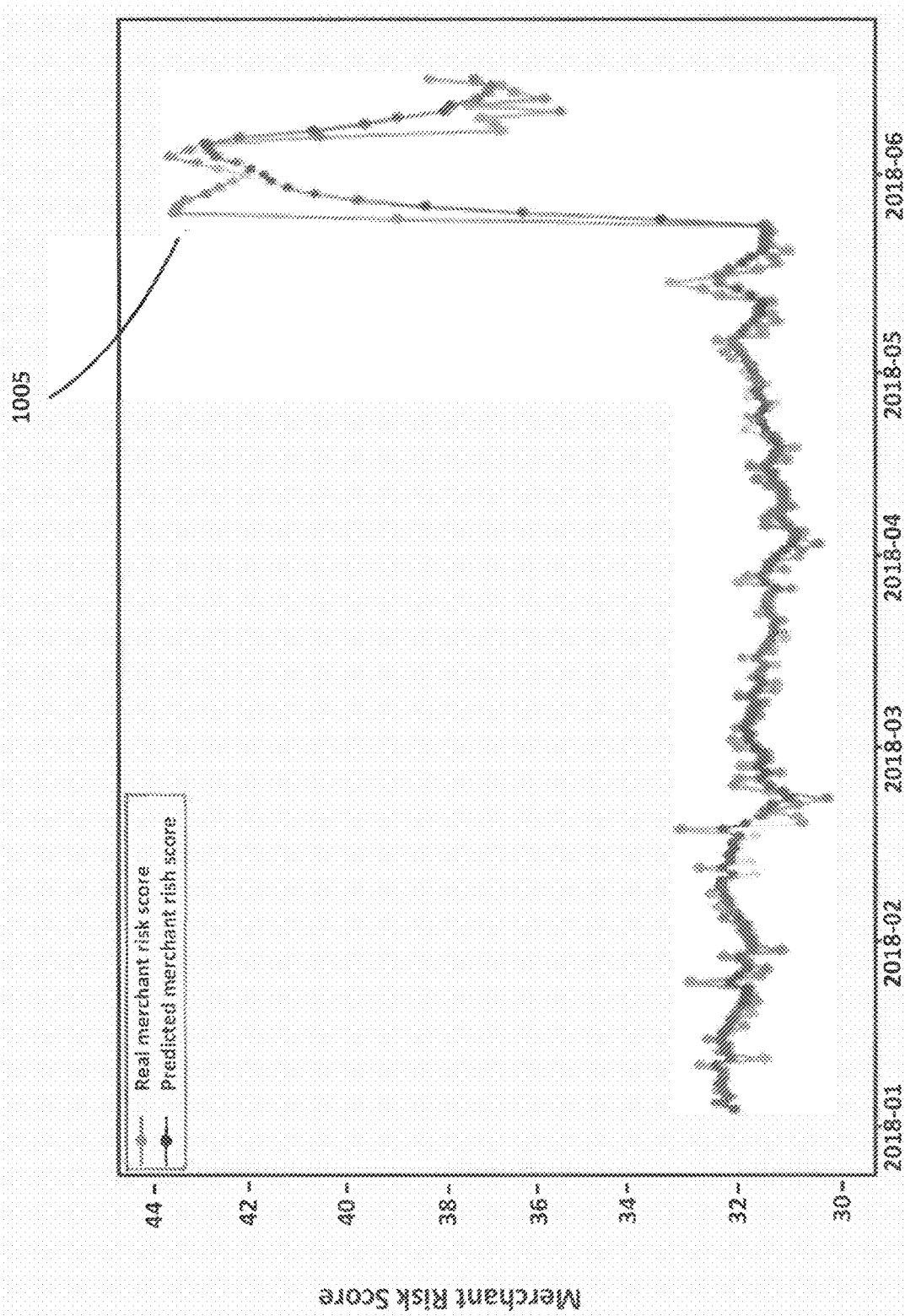
FIG. 10 may illustrate a sudden jump in risk score 1005 and the score stays high for a period of time.

FIGS. 8, 9 and 10 present three example of merchants exhibiting anomalous behavior. The first example (FIG. 8) may illustrate a point anomaly where a single spike 805 may be seen in the graph.

The second example (FIG. 9) may illustrate a score shift 905 (from low to high) followed by two spikes.

The third example (FIG. 10) may illustrate a sudden jump in risk score 1005 and the score stays high for a period of time.

How to evaluate new Merchants?

In production, "peer group" risk scores may be maintained. A peer group may be a collection of merchants that provide similar goods or services. For instance, all restaurants may belong to the same peer group. There may be a one-to-one mapping between a merchant category code (MCC) and a peer group. There may be ~750 MCC codes in traditional transaction data, which may correspond to ~750 peer groups. The ~750 MCC groups may be further classified into 22 merchant category groups (MCGs) in the system. For instance, the restaurant MCC (5812) and fast-food restaurant MCC (5814) may be assigned the same MCG (10). The hierarchical classification of merchants at different granularities ensures that peer groups may be produced with robust statistics. If a merchant category code (MCC) has a small number of transactions, the system and method may move up one layer to use the merchant category group (MCG). Similar to calculating the merchant risk score, all transaction risk scores in the peer group may be aggregated on an hourly basis and the aggregated risk scores may be compiled at the end of each day to produce a peer group risk score. Peer group analysis may help assess the risk of new merchants that have short historical data.

Figure 3:
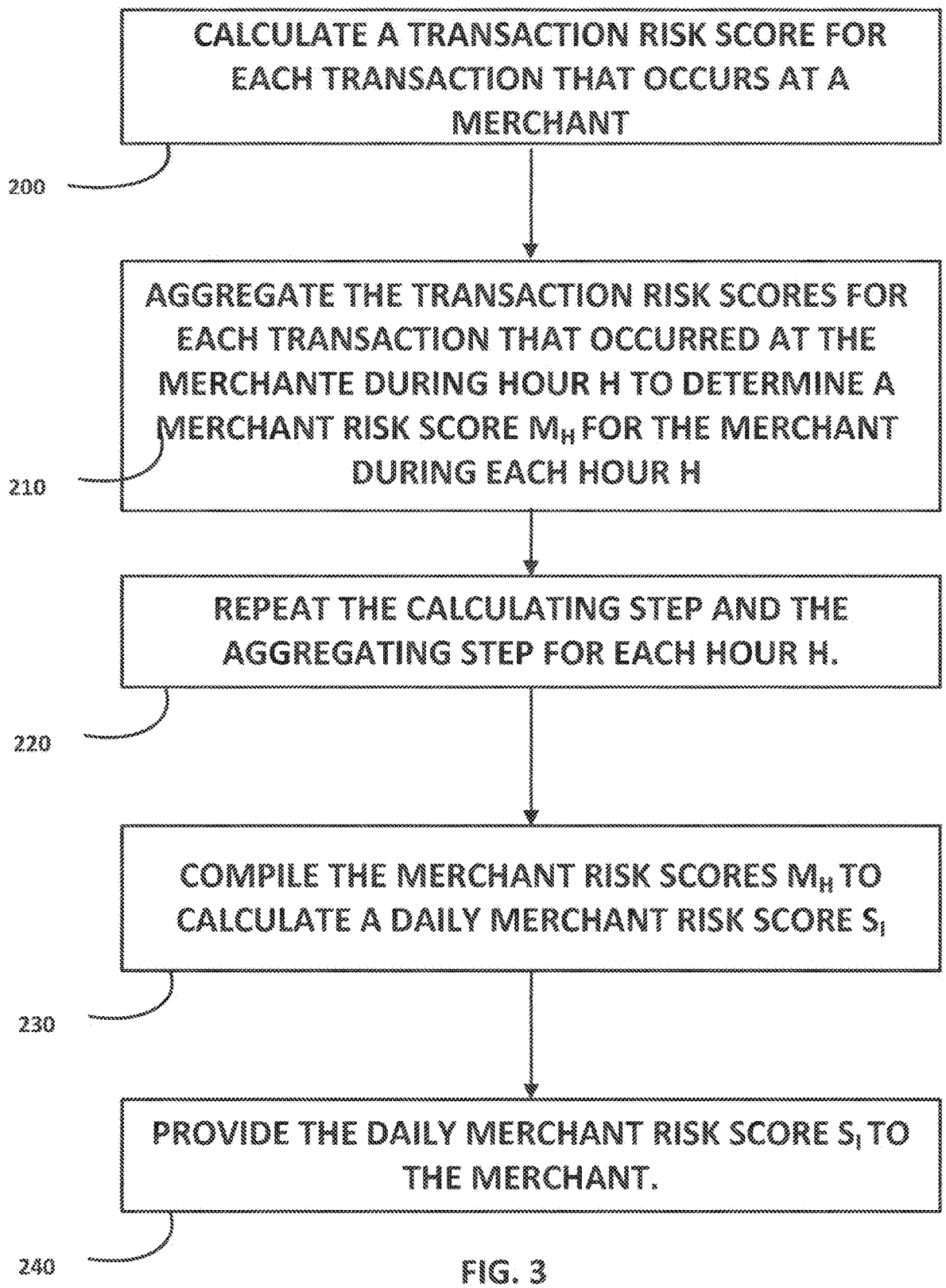
FIG. 3 may be a flowchart of blocks undertaken by the method.

A computer implemented method for real-time determination of a merchant risk level may be illustrated in FIG. 3. At block 200, a transaction risk score may be calculated for each transaction that occurs at a merchant during an hour h, wherein h is from 1 to 24. The transaction risk model 202 may be trained offline in a supervised way using a combination of entity profiles and non-aggregated transaction specific features (such as location, time, dollar amount, etc.) as features and chargeback/fraud information as labels. The output of the model may be the probability of a transaction being fraudulent.

The probability may be converted into a risk score value between 1 and 100 where a higher score indicates a high-risk transaction, and a lower score indicates a low-risk transaction. To score each transaction, the proposed system may use a variety of models. Two models that may be used as an ensemble may include (i) Gradient Boosting Machine (GBM), and (ii) Recurrent Neural Network (RNN) including two long short-term memory (LSTM) layers.

At block 210 the transaction risk scores for each transaction that occurred at the merchant during hour h may be aggregated to obtain a merchant risk score $m_h$ for the merchant during each hour h as illustrated in FIG. 5. At block 220, the calculating step and the aggregating step may be repeated for each hour h.

At block 230, the merchant risk scores $m_h$ (535, 530, 525) may be compiled (540) to calculate a daily merchant risk score $s_i$ (550). The merchant risk model 203 may then aggregate the transaction risk scores corresponding to a merchant and may yield a merchant risk score in the range 1-100 using a merchant risk score engine 207 (FIG. 2). A higher score may indicate a high-risk merchant, and a lower score may indicate a low-risk merchant. Logically, the scores may be adjusted to reflect the desires of the user. In some embodiments, a mean of the transaction risk scores may be calculated for all the transactions that occurred during hour h.

At block 240 the daily merchant risk score $s_i$ (550) may be provided to the merchant. In response, the merchant may see virtually immediately when the merchant risk score is approaching an alert level. In some embodiments, the system and method may identify the source of a change in the merchant risk score. For example, if a certain card is causing problems, the merchant may make an effort to look for that card. In other embodiments, purchases during a certain period of time may be a problem and the merchant may take additional risk reduction steps during those periods of time. In yet another embodiment, the merchant may be informed the sale of certain items has been identified as risky and the merchant may adjust the sales of those good.

As can be seen, the system and method may address the technical problem of how to check a merchant rating score in a computationally efficient manner. In the past, checking a merchant rating in a timely manner was not even possible. Theoretically, a user may have made a daily request for an update which may or may not have resulted in a response as providing daily updates is simply not done at the present time. Logically, merchant aggregation is also not done at the present time. At a minimum, the system and method enable some new functionality which was not possible previously, using any computer system.

In some further embodiments, the method may also determine a peer group for the merchant, where the peer group includes one or more peer merchants that provide similar goods or services as the merchant. A transaction risk score may be calculated for each transaction that occurs at the peer group during an hour h, wherein h is from 1 to 24. The transaction risk score for each transaction that occurred at the peer group during hour h may be aggregated to obtain a peer group risk score $p_h$ for the peer group. The calculating step and the aggregating step may be repeated for each hour h. The peer group scores $p_h$ may be compiled to calculate a daily peer group risk score $p_i$. The daily peer group risk score $p_i$ may be compared to the daily merchant risk score $s_i$ to better determine the level of transaction risk for a single merchant in view of the world of similar merchants.

In some embodiments, an anomaly detection algorithm may be used to determine if an anomaly exists in the daily merchant risk score $s_i$. If an anomaly is detected, the merchant may be added to a list. The anomaly detection algorithm may include determining a first merchant risk level at a time $t_n$, wherein the first merchant risk level $y_n$ is a running average of the merchant daily risk scores si, wherein the first merchant risk level $y_n$ is calculated as, $$y_n = \sum_{i=1}^{n} e^{-(t_n-t_i)/T} s_i / \sum_{i=1}^{n} e^{-(t_n-t_i)/T}$$

And wherein T is a decay parameter and i is from 1 to n.

A second merchant risk level at a time $t_{n+1}$ may be determined wherein the second merchant risk level $y_{n+1}$ is calculated as, $$y_{n+1} = \sum_{i=1}^{n+1} e^{-(t_{n+1}-t_i)/T} s_i / \sum_{i=1}^{n+1} e^{-(t_{n+1}-t_i)/T}$$

The first merchant risk level $y_n$ may be compared to the second merchant risk level $y_{n+1}$. If the difference between the first merchant risk level $y_n$ and the second merchant risk level $y_{n+1}$ is above a threshold, then an anomaly may be identified.

As mentioned previously, machine learning may be used to determine if a transaction is likely fraudulent. A first entity profile may be created using a first dataset. A second entity profile may be created using a second dataset, where the second entity profile is created using the first entity profile and the second entity profile may be used to train a third dataset containing transaction data to determine a probability that a transaction is fraudulent. The probability that the transaction is fraudulent may be converted into a transaction risk score. The second entity profile may include user and merchant embeddings and the first entity profile may include one or more of a historical fraud rate, a transaction decline rate, and an average dollar amount. The transaction risk score may be any of 1 to 100 for example. Logically, a high transaction risk score may indicate a high-risk transaction and a low transaction risk score may indicate a low risk transaction.

The system 400 may include but is not limited to any combination of a LAN, a MAN, a WAN, a mobile, a wired or wireless network, a private network, or a virtual private network. Moreover, while only one remote computing device 104 is illustrated in FIG. 1 to simplify and clarify the description, it is understood that any number of client computers are supported and can be in communication within the system 100.

Additionally, certain embodiments are described herein as including logic or a number of components, modules, blocks, or mechanisms. Modules and method blocks may constitute either software modules (e.g., code or instructions embodied on a machine-readable medium or in a transmission signal, wherein the code is executed by a processor) or hardware modules. A hardware module is tangible unit capable of performing certain operations and may be configured or arranged in a certain manner. In example embodiments, one or more computer systems (e.g., a standalone, client or server computer system) or one or more hardware modules of a computer system (e.g., a processor or a group of processors) may be configured by software (e.g., an application or application portion) as a hardware module that operates to perform certain operations as described herein.

In various embodiments, a hardware module may be implemented mechanically or electronically. For example, a hardware module may comprise dedicated circuitry or logic that is permanently configured (e.g., as a special-purpose processor, such as a field programmable gate array (FPGA) or an application-specific integrated circuit (ASIC)) to perform certain operations. A hardware module may also comprise programmable logic or circuitry (e.g., as encompassed within a processor or other programmable processor) that is temporarily configured by software to perform certain operations. It will be appreciated that the decision to implement a hardware module mechanically, in dedicated and permanently configured circuitry, or in temporarily configured circuitry (e.g., configured by software) may be driven by cost and time considerations.

Accordingly, the term "hardware module" should be understood to encompass a tangible entity, be that an entity that is physically constructed, permanently configured (e.g., hardwired), or temporarily configured (e.g., programmed) to operate in a certain manner or to perform certain operations described herein. As used herein, "hardware-implemented module" refers to a hardware module. Considering embodiments in which hardware modules are temporarily configured (e.g., programmed), each of the hardware modules need not be configured or instantiated at any one instance in time. For example, where the hardware modules comprise a processor configured using software, the processor may be configured as respective different hardware modules at different times. Software may accordingly configure a processor, for example, to constitute a particular hardware module at one instance of time and to constitute a different hardware module at a different instance of time.

Hardware modules may provide information to, and receive information from, other hardware modules. Accordingly, the described hardware modules may be regarded as being communicatively coupled. Where multiple of such hardware modules exist contemporaneously, communications may be achieved through signal transmission (e.g., over appropriate circuits and buses) that connect the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output. Hardware modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods or routines described herein may be at least partially processor-implemented. For example, at least some of the operations of a method may be performed by one or processors or processor-implemented hardware modules. The performance of certain of the operations may be distributed among the one or more processors, not only residing within a single machine, but deployed across a number of machines. In some example embodiments, the processor or processors may be located in a single location (e.g., within a home environment, an office environment or as a server farm), while in other embodiments the processors may be distributed across a number of locations.

The one or more processors may also operate to support performance of the relevant operations in a "cloud computing" environment or as a "software as a service" (SaaS). For example, at least some of the operations may be performed by a group of computers (as examples of machines including processors), these operations being accessible via a network (e.g., the Internet) and via one or more appropriate interfaces (e.g., application program interfaces (APIs).)

The performance of certain of the operations may be distributed among the one or more processors, not only residing within a single machine, but deployed across a number of machines. In some example embodiments, the one or more processors or processor-implemented modules may be located in a single geographic location (e.g., within a home environment, an office environment, or a server farm). In other example embodiments, the one or more processors or processor-implemented modules may be distributed across a number of geographic locations.

Some portions of this specification are presented in terms of algorithms or symbolic representations of operations on data stored as bits or binary digital signals within a machine memory (e.g., a computer memory). These algorithms or symbolic representations are examples of techniques used by those of ordinary skill in the data processing arts to convey the substance of their work to others skilled in the art. As used herein, an "algorithm" is a self-consistent sequence of operations or similar processing leading to a desired result. In this context, algorithms and operations involve physical manipulation of physical quantities. Typically, but not necessarily, such quantities may take the form of electrical, magnetic, or optical signals capable of being stored, accessed, transferred, combined, compared, or otherwise manipulated by a machine. It is convenient at times, principally for reasons of common usage, to refer to such signals using words such as "data," "content," "bits," "values," "elements," "symbols," "characters," "terms," "numbers," "numerals," or the like. These words, however, are merely convenient labels and are to be associated with appropriate physical quantities.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or a combination thereof), registers, or other machine components that receive, store, transmit, or display information.

As used herein any reference to "embodiments," "some embodiments" or "an embodiment" or "teaching" means that a particular element, feature, structure, or characteristic described in connection with the embodiment is included in at least one embodiment. The appearances of the phrase "in some embodiments" or "teachings" in various places in the specification are not necessarily all referring to the same embodiment.

Some embodiments may be described using the expression "coupled" and "connected" along with their derivatives. For example, some embodiments may be described using the term "coupled" to indicate that two or more elements are in direct physical or electrical contact. The term "coupled," however, may also mean that two or more elements are not in direct contact with each other, but yet still co-operate or interact with each other. The embodiments are not limited in this context.

Further, the figures depict preferred embodiments for purposes of illustration only. One skilled in the art will readily recognize from the following discussion that alternative embodiments of the structures and methods illustrated herein may be employed without departing from the principles described herein Upon reading this disclosure, those of skill in the art will appreciate still additional alternative structural and functional designs for the systems and methods described herein through the disclosed principles herein. Thus, while particular embodiments and applications have been illustrated and described, it is to be understood that the disclosed embodiments are not limited to the precise construction and components disclosed herein. Various modifications, changes and variations, which will be apparent to those skilled in the art, may be made in the arrangement, operation and details of the systems and methods disclosed herein without departing from the spirit and scope defined in any appended claims.

The invention claimed is:

1. A computer implemented method for real-time determination of a merchant risk level, the method comprising:
calculating, with a transaction risk model of a transaction analysis system, a transaction risk score for each transaction that occurs at a merchant during an hour h, wherein h is from 1 to 24, wherein the transaction risk score is a continuous score, and wherein the transaction risk model comprises at least one of a Gradient Boosting Machine model or a Recurrent Neural Network model;
aggregating the transaction risk scores for each transaction that occurs at the merchant during hour h to obtain a merchant risk score $m_h$ for the merchant during each hour h;
repeating the calculating step and the aggregating step for each hour h;
compiling the merchant risk scores $m_h$ to calculate a daily merchant risk score $s_i$;
providing the daily merchant risk score $s_i$ to the merchant.

2. The method of claim 1, wherein the step of aggregating the transaction risk score for each transaction that occurred at the merchant during hour h, further comprises calculating a mean of the transaction risk scores for all the transactions that occurred during hour h.

3. The method of claim 1, further comprising:
determining a peer group for the merchant, wherein the peer group comprises one or more peer merchants that provide similar goods or services as the merchant;
calculating a peer group transaction risk score for each transaction that occurs at the peer group during an hour h, wherein h is from 1 to 24;
aggregating the peer group transaction risk score for each transaction that occurs at the peer group during hour h to obtain a peer group risk score $p_h$ for the peer group;
repeating the calculating step and the aggregating step for each hour h;
compiling the peer group risk scores $p_h$ to calculate a daily peer group risk score $p_i$; and,
comparing the daily peer group risk score $p_i$ to the daily merchant risk score $s_i$.

4. The method of claim 1 further comprising:
using an anomaly detection algorithm to determine if an anomaly exists in the daily merchant risk score $s_i$; and,
if an anomaly is detected, adding the merchant to a list.

5. The method of claim 4, wherein the anomaly detection algorithm comprises:
determining a first merchant risk level at a time $t_n$, wherein the first merchant risk level $y_n$ is a running average of the merchant daily risk scores $s_i$, wherein the first merchant risk level $y_n$ is calculated as, $$y_n = \sum_{i=1}^{n} e^{-(t_n-t_i)/T} s_i \Big/ \sum_{i=1}^{n} e^{-(t_n-t_i)/T}$$

wherein T is a decay parameter and i is from 1 to n;
determining a second merchant risk level at a time $t_{n+1}$, wherein the second merchant risk level $y_{n+1}$ is calculated as, $$y_n = \sum_{i=1}^{n} e^{-(t_n-t_i)/T} s_i \Big/ \sum_{i=1}^{n} e^{-(t_n-t_i)/T}$$

comparing the first merchant risk level $y_n$ to the second merchant risk level $y_{n+1}$;
if the difference between the first merchant risk level $y_n$ and the second merchant risk level $y_{n+1}$ is above a threshold, then an anomaly is identified.

6. The method of claim 1, further comprising:
creating a first entity profile using a first dataset;
creating a second entity profile using a second dataset, wherein the second entity profile is created:
using the first entity profile and the second entity profile to train a third dataset containing transaction data to determine a probability that a transaction is fraudulent; and
converting the probability that the transaction is fraudulent into a transaction risk score.

7. The method of claim 6, wherein the transaction risk score is any of 1 to 100.

8. The method of claim 7, wherein a high transaction risk score indicates a high-risk transaction and a low transaction risk score indicates a low risk transaction.

9. The method of claim 6, wherein the first entity profile comprises one or more of a historical fraud rate, a transaction decline rate, and an average dollar amount.

10. The method of claim 6, wherein the second entity profile comprises user and merchant embeddings.

11. A computer system comprising an input output circuit, a memory for storing computer executable instructions and a processor physically configured according to computer executable instructions, the computer executable instructions implementing a method for real-time determination of a merchant risk level, the method comprising computer executable blocks for:
calculating, with a transaction risk model stored in the memory, a transaction risk score for each transaction that occurs at a merchant during an hour h, wherein h is from 1 to 24, wherein the transaction risk score is a continuous score, and wherein the transaction risk model comprises at least one of a Gradient Boosting Machine model or a Recurrent Neural Network model;
aggregating the transaction risk scores for each transaction that occurs at the merchant during hour h to obtain a merchant risk score $m_h$ for the merchant during each hour h;
repeating the calculating step and the aggregating step for each hour h;
compiling the merchant risk scores $m_h$ to calculate a daily merchant risk score $s_i$; and,
providing the daily merchant risk score $s_i$ to the merchant.

12. The computer system of claim 11, wherein the step of aggregating the transaction risk score for each transaction that occurred at the merchant during hour h, further comprises calculating a mean of the transaction risk scores for all the transactions that occurred during hour h.

13. The computer system of claim 11, further comprising computer executable instructions for:
determining a peer group for the merchant, wherein the peer group comprises one or more peer merchants that provide similar goods or services as the merchant;
calculating a peer group transaction risk score for each transaction that occurs at the peer group during an hour h, wherein h is from 1 to 24;
aggregating the peer group transaction risk score for each transaction the occurred at the peer group during hour h to obtain a peer group risk score $p_h$ for the peer group;
repeating the calculating step and the aggregating step for each hour h;
compiling the peer group risk scores $p_h$ to calculate a daily peer group risk score $p_i$; and,
comparing the daily peer group risk score $p_i$ to the daily merchant risk score $s_i$.

14. The computer system of claim 11, further comprising computer executable instructions for:
using an anomaly detection algorithm to determine if an anomaly exists in the daily merchant risk score $s_i$; and,
if an anomaly is detected, adding the merchant to a list.

15. The computer system of claim 14, wherein the anomaly detection algorithm comprises computer executable steps for:
determining a first merchant risk level at a time $t_n$, wherein the first merchant risk level $y_n$ is a running average of the merchant daily risk scores $s_i$, wherein the first merchant risk level $y_n$ is calculated as, $$y_n = \sum_{i=1}^{n} e^{-(t_n-t_i)/T} s_i \Big/ \sum_{i=1}^{n} e^{-(t_n-t_i)/T}$$

wherein T is a decay parameter and i is from 1 to n;
determining a second merchant risk level at a time $t_{n+1}$, wherein the second merchant risk level $y_{n+1}$ is calculated as, $$y_{n+1} = \sum_{i=1}^{n+1} e^{-(t_{n+1}-t_i)/T} s_i \Big/ \sum_{i=0}^{n+1} e^{-(t_{n+1}-t_i)/T}$$

comparing the first merchant risk level $y_n$ to the second merchant risk level $y_{n+1}$; and
if the difference between the first merchant risk level $y_n$ and the second merchant risk level $y_{n+1}$ is above a threshold, then an anomaly is identified.

16. The computer system of claim 11, further comprising computer executable instructions for:
   creating a first entity profile using a first dataset;
   creating a second entity profile using a second dataset, wherein the second entity profile is created:
   using the first entity profile and the second entity profile to train a third dataset containing transaction data to determine a probability that a transaction is fraudulent; and
   converting the probability that the transaction is fraudulent into a transaction risk score.

17. The computer system of claim 16, wherein the transaction risk score is any of 1 to 100.

18. The computer system of claim 17, wherein a high transaction risk score indicates a high-risk transaction and a low transaction risk score indicates a low risk transaction.

19. The computer system of claim 16, wherein the first entity profile comprises one or more of a historical fraud rate, a transaction decline rate, and an average dollar amount.

20. The computer system of claim 16, wherein the second entity profile comprises user and merchant embeddings.

\* \* \* \* \*